Oct. 15, 1946.      R. H. GILL      2,409,352
RIVET
Filed Jan. 29, 1943
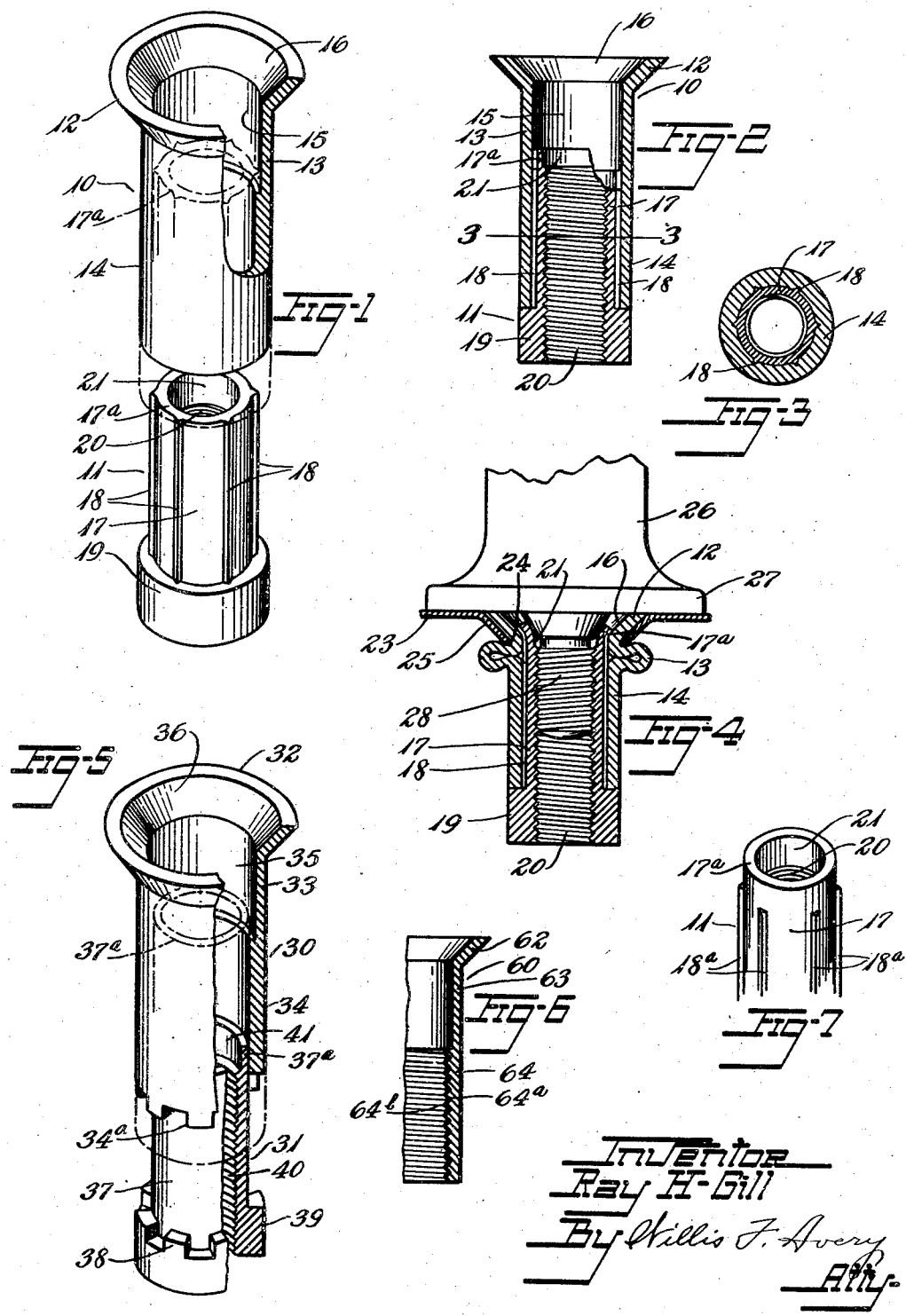
Inventor
Ray H. Gill
By Willis F. Avery
Atty.

Patented Oct. 15, 1946

2,409,352

UNITED STATES PATENT OFFICE 2,409,352

RIVET

Ray H. Gill, Akron, Ohio, assignor to The B. F. Goodrich Company, New York, N. Y., a corporation of New York Application January 29, 1943, Serial No. 473,939

10 Claims. (Cl. 85—40)

This invention relates to rivets and especially to reinforced tubular rivets suitable for detachably securing structures to walls of thin material.

It has been difficult to fasten structures to walls of thin sheet material such, for example, as aluminum alloy, in a detachable manner, especially where blind riveting must be resorted to, i. e., where only one side of the wall is available for operations. With fastening means such as threaded screws and welding, the results have not been wholly satisfactory. Ordinary rivets cannot be applied in the absence of any means for bucking the rivets from the opposite side of the sheet.

Objects of the invention are to provide an improved rivet; to provide a rivet of reinforced construction for blind riveting operations; to provide a composite tubular rivet; to provide for preventing relative rotation and separation of the respective parts of the rivet; and to provide for simplicity of construction, convenience of assembly and effectiveness of operation.

Further objects are to provide for retaining the rivet in an aperture in a wall of thin sheet material; to provide for detachably securing a structure to the wall; and to provide a rivet in part of ductile material for setting and in part of less ductile hard material for resisting effectively structural failure of the joint between the rivet and the structure.

These and other objects and advantages of the invention will be apparent from the following description.

In the accompanying drawing, which forms a part of this specification, and in which like numerals are employed to designate like parts throughout the same:

Fig. 1 is a perspective view showing a rivet constructed in accordance with and embodying the invention, parts being disassembled and partly broken away and partly in section, and broken lines showing the parts in an assembled relation;

Fig. 2 is a sectional view showing the rivet in an assembled condition prior to setting;

Fig. 3 is a sectional view taken along the line 3—3 of Fig. 2;

Fig. 4 is a view showing the rivet secured in a set condition in an aperture in a wall of thin material, and showing a tool for applying the rivet to the wall;

Fig. 5 is a view like Fig. 1 showing a modified construction of the rivet;

Fig. 6 is a fragmentary view in section of another modified construction of the rivet, and Fig. 7 is a fragmentary perspective view showing a modified construction of a part of the rivet shown in Fig. 1.

The rivet illustrated in Figs. 1 to 4 comprises a continuously annular cylindrical body portion or member 10 of ductile material which may be an aluminum alloy, and a continuously annular cylindrical sleeve or inner body portion or member 11 of less ductile hard material such, for example, as steel. The cylindrical body portion 10 has a flanged end 12, an expansible portion 13 adjacent the flanged end and an end portion 14; and has a bore 15 of substantially uniform diameter extending therethrough except that it is counter-bored at the expansible portion 13 to provide for a thin wall for facilitating expanding this portion 13 for holding the rivet against a wall 23. The flanged end 12 is preferably counter-sunk or substantially frusto-conical for fitting the depressed margin 25 of an aperture 24 in a wall 23, as shown especially in Fig. 4, but may be a flat or other suitable shape for some applications.

The bore 15 terminates, preferably, at the flanged end 12 in an outwardly flared bore 16 which may also be substantially frusto-conical.

The sleeve or inner body portion 11 has a portion 17 of reduced diameter for snugly fitting within the bore 15 of the body 10 at the end portion 14 as shown especially in Fig. 3, and has a plurality of spaced-apart wedge elements or ribs 18 extending axially thereof, as shown especially in Figs. 1 and 7. These wedge elements 18 are embedded in the wall of the end portion 14 when the body portion 10 and the sleeve 11 are assembled as shown in Fig. 2, and effectively prevent separation and rotation of the sleeve 11 in relation to the body portion 10. The sleeve 11 also has a flange portion 19 of suitable extent to resist axial deformation and of substantially the same outside diameter as the body portion 10, whereby the steel sleeve 11 is adapted for applying axial force to the body portion 10 at the end portion 14 for expanding the expansible portion 13 in the manner shown in Fig. 4, in which it will be seen that the expansion is substantially confined to the expansible portion 13 while the other portions of the body portion 10 including the end portion 14 remain unexpanded.

It is desirable that the portion 17 of reduced diameter extend within the end portion 14 of the body portion 10 and extend beyond the lower margin of the expansible portion 13 to an extent, preferably, equivalent to the depth of an enlarged bore 21 in the end 17a opposite the flange portion 19, as shown by dotted lines in Fig. 1. For the arrangement shown in Fig. 7, the wall of the enlarged bore 21 may be flared or spread open to contact the wall of the expansible portion 13 for preventing axial separation of the body portion 10 and the sleeve 11 when assembled as shown in Fig. 2. However, the portion 17 of reduced diameter may extend only to the lower margin of the expansible portion 13, especially in those applications in which the end 17a is not flared into contact with the wall of the flange 12, when the expansible portion 13 has been expanded as shown in Fig. 4.

The steel sleeve 11 has a threaded bore 20 terminating, if desired, in an enlarged bore 21 at the end 17a opposite the flange portion 19 thus providing for a thinner wall at this end 17a of the sleeve 11 to facilitate flaring the wall of the portion 17 into contact with the wall of the flange 12, when the expansible portion 13 has been expanded as shown in Fig. 4, for additionally securing the parts against axial separation. The threaded bore 20 permits engaging the rivet with a threaded member 28 of a suitable tool 26 for applying axial force to expand the expansible portion 13, thus holding the rivet against the wall 23.

In assembling the tubular rivet, the sleeve 11 is forced into the bore 15 of the body portion 10 at the end portion 14, and since the steel sleeve is of less ductile hard material, the spaced-apart wedge elements or ribs 18 are embedded in the aluminum wall of the end portion 14 for securing the parts against axial separation and rotation. The sleeve 11 is engaged with the body portion 10 to an extent sufficient to contact the flange portion 19 with the end of the end portion 14, the portion 17 of the sleeve 11 extending beyond the lower margin of the expansible portion 13 as shown in Figs. 1 and 2.

When applying the rivet to the wall 23 of thin sheet metal, the assembled rivet, as shown in Fig. 2, is engaged preferably, with the threaded member 28 of the tool 26 and inserted in the aperture 24 until the flanged end 12 contacts the countersunk margin 25, whereupon the expansible portion 13 may then be expanded by the application of axial force from the tool 26 through the threaded member 28, while an anvil portion 27 of the tool maintains the flanged portion 12 against the margin 25, thus holding the rivet in place against the wall. During the application of the axial force, the steel sleeve 11 is drawn toward the flanged end 12 and is drawn to an extent sufficient to permit flaring the end 17a of the sleeve 11 into contact with the wall of the outwardly flared bore 16, thus additionally securing the parts against axial separation. The wedge elements or ribs 18 being of harder material than the body portion 10 remain embedded in the end portion 14 effectively preventing relative rotation of the sleeve 11 and the body portion 10 and become embedded in the wall of the flanged end 12 during the drawing and flaring operations, as shown especially in Fig. 4.

In this manner the body portion 10 and the sleeve or inner body portion 11 are interlocked and separation is prevented effectively. When the tubular rivet is mounted in place in the aperture 24, as shown in Fig. 4, the threaded member 28 of the tool 26 may be removed and a structure such, for example, as a cabinet, may be attached to the wall 23 as by a suitable bracket and threaded screw engaging with the threaded bore 20 of the sleeve 11. Since the sleeve 11 is of less ductile hard material, such as steel, the threads of the bore 20 will withstand repeated attachment of the structure to the wall 23 and detachment therefrom and provide added resistance to structural failure of the joint between the tubular rivet and the structure by virtue of their strength under tension and shear conditions.

In the modified construction shown in Fig. 5, a body portion 30 is substantially like the body portion 10, and comprises a flanged end 32, an expansible portion 33, and an end portion 34. The body portion 30 of ductile material, preferably aluminum alloy, has a bore 35 of substantially uniform diameter extending therethrough except that it is counterbored at the expansible portion 33 and terminates, preferably, in an outwardly flared bore 36 at the flanged end 32. The expansible portion 33 has a wall of reduced thickness to facilitate the expanding thereof. The end portion 34 terminates in a toothed portion 34a for engaging with a sleeve 31.

The sleeve or inner body portion 31 of less ductile hard material, preferably steel, has a threaded bore 40, and has a portion 37 adapted to fit snugly within the end portion 34 of the body portion 30, and has a flange portion 39 having a toothed portion 38 for interlocking with the toothed portion 34a. It is desirable that the portion 37 extend within the end portion 34 of the body portion 30 and beyond the lower margin of the expansible portion 33 to an extent, preferably, equivalent to the depth of a bore 41 of substantially uniform diameter in the end 37a opposite the flange portion 39 as shown by dotted lines in Fig. 5, whereby the end 37a may be flared into contact with the wall of the expansible portion 33 for securing the parts against axial separation. As discussed hereinabove, the portion 37 may, however, extend only to the lower margin of the expansible portion 33. The flange portion 39 is substantially the same diameter as the outside diameter of the cylindrical body 30 and is of an extent sufficient to permit applying axial force to the end portion 34 of the body 30 with negligible distortion of the flange portion 39.

In assembling the modified tubular rivet, the portion 37 is press-fitted into the bore 35 of the end portion 34 until the toothed portions 34a and 38 are interlocked, thereby preventing rotation of the sleeve 31 with respect to the cylindrical body portion 30.

It is desirable that the threaded bore 40 terminate in a bore 41 of greater diameter and of substantially uniform diameter at the end 37a of the portion 37, as shown in Fig. 5, to provide for a wall of reduced thickness for facilitating flaring the end 37a into contact with the wall of the expansible portion 33 and of the flanged end 32 when the rivet is attached to the wall 23, and thereby additionally securing the parts against axial separation. The operation of assembling and of mounting the rivet to the wall 23 is accomplished in the manner described hereinabove for the rivet shown in Fig. 1.

The invention includes a further modification of the rivet as shown in Fig. 6, in which an integral, tubular, and reinforced construction may be employed. Such a rivet 60 of ductile material comprises a flanged end 62, an expansible portion 63 adjacent the flanged end, and an interiorly threaded end portion 64 having a wall of greater thickness than that of the expansible portion. The threads 64a may be reinforced for resisting failure under tension and shear conditions by a suitable electroplating 64b, such, for example, as chromium, or a thin sprayed coating of metal, such as steel, or other means adapted to strengthen the threads, such as heat treatment. Alternately, the end portion 64 may be of a laminated wall construction comprising an outer layer of the ductile material to which is bonded an inner reinforcing layer of less ductile hard material, such, for example, as sprayed steel, or steel tubing. The threads may be cut subsequently in the latter layer.

Variations may be made without departing from the scope of the invention as it is defined in the following claims.

I claim:

1. A tubular rivet structure comprising a cylindrical body portion having a bore of substantially uniform diameter extending therethrough and terminating in a counterbore, said cylindrical body portion including a flanged end and an expansible portion adjacent said flanged end, a tubular body portion having a portion of reduced diameter disposed within said bore of said cylindrical body portion at the end opposite said flanged end and having a flange portion of substantially the same outer diameter as said cylindrical body portion for applying axial force to said cylindrical body portion for expanding said expansible portion, said tubular body portion having a threaded bore for engaging with a threaded member inserted in said rivet from said flanged end, and fastening means for securing together said cylindrical body portion and said tubular body portion.

2. A rivet structure as defined in claim 1 in which said fastening means comprises a plurality of spaced-apart rib elements extending axially along said portion of reduced diameter of said tubular body portion in a manner for embedded association with the wall of said cylindrical body portion.

3. A rivet structure as defined in claim 1 in which said fastening means comprises a toothed portion at the end of said cylindrical body portion opposite said flanged end engaging a toothed portion of said flanged portion of said tubular body portion.

4. A tubular rivet structure comprising a body portion having a flanged end and a bore of substantially uniform diameter terminating in a counterbore adjacent said flanged end, said counterbore terminating at said flanged end in an outwardly flared bore, said body portion having an expansible portion adjacent said flanged end and an end portion, and an inner body portion having a portion disposed within said bore of substantially uniform diameter at said end portion in telescopic relationship therewith and a flanged portion contacting said end portion of said body portion and adapted for applying axial force to said body portion for expanding said expansible portion, said inner body portion having a threaded bore for engaging a threaded member inserted in said rivet structure from said flanged end, said threaded bore terminating in a counterbore providing a thinner wall portion opposite said flanged portion for expanding into contact with the wall of said outwardly flared bore at said flanged end, and means for interlocking said body portion and said inner body portion for preventing relative rotation.

5. A tubular rivet structure comprising a continuously annular cylindrical body portion having a bore of substantially uniform diameter extending therethrough and terminating in a counterbore, said cylindrical body portion including a flanged end adjacent said counterbore, an end portion, and an expansible portion adjacent said flanged end, and a continuously annular cylindrical sleeve disposed in said end portion of said cylindrical body portion in telescopic relationship therewith and snugly fitting within said bore of substantially uniform diameter, said sleeve having a flange portion contacting said end portion for applying axial force to said cylindrical body portion and having a plurality of spaced-apart rib elements extending axially along the outer surface of said sleeve in a manner for embedded association with the wall of said end portion of said cylindrical body portion for preventing rotation of said sleeve in relation to said cylindrical body portion, and said sleeve having an interiorly threaded portion for engaging a threaded member inserted in said tubular rivet structure from said flanged end.

6. A tubular rivet structure comprising a continuously annular cylindrical body portion having a bore of substantially uniform diameter extending therethrough and terminating in a counterbore, said cylindrical body portion including a flanged end outwardly of said counterbore, an expansible portion adjacent said flanged end, and an end portion terminating in a toothed portion, and a continuously annular cylindrical sleeve having a portion disposed in said end portion of said cylindrical body portion in telescopic relationship therewith and snugly fitting within said bore of substantially uniform diameter, said sleeve including a flange portion having a toothed portion for interlocking with said toothed portion of said end portion of said cylindrical body portion for preventing rotation of said sleeve in relation to said cylindrical body portion, and said sleeve having an interiorly threaded bore for engaging a threaded member inserted in said tubular rivet structure from said flanged end.

7. A tubular rivet structure comprising a continuously annular cylindrical body portion of ductile material and having a flanged end, an expansible portion adjacent said flanged end, and an end portion, said cylindrical body portion having a bore of substantially uniform diameter terminating in a counterbore, said counterbore terminating in an outwardly flared bore at said flanged end, and a continuously annular sleeve of less-ductile hard material and having a portion disposed in said bore of substantially uniform diameter of said cylindrical body portion at said end portion in telescopic relationship therewith and snugly fitting therein, said portion of said sleeve having a plurality of spaced-apart rib elements extending axially along the outer surface of said sleeve in a manner for embedded association with the wall of said end portion of said cylindrical body portion for preventing rotation of said sleeve in relation to said cylindrical body portion, said sleeve having a flange portion of substantially the same outer diameter as said cylindrical body portion and contacting said end portion for applying axial force for expanding said expansible portion, and said sleeve having a threaded bore for engaging a threaded member and terminating in an enlarged bore of substantially uniform diameter at the end opposite said flanged portion providing a thinner wall portion for flaring into contact with the wall of said outwardly flared bore at said flanged end of said cylindrical body portion for additionally securing said cylindrical body portion and said sleeve against axial separation.

8. A tubular rivet structure comprising a continuously annular cylindrical body portion of ductile material and having a flanged end, an expansible portion adjacent said flanged end, and an end portion terminating in a toothed portion, said cylindrical body portion having a bore of substantially uniform diameter terminating in a counterbore, said counterbore terminating in an outwardly flared bore at said flanged end, and a continuously annular cylindrical sleeve of less-ductile hard material and having a portion disposed in said end portion of said cylindrical body portion in telescopic relationship therewith and snugly fitting within said bore of substantially uniform diameter, said sleeve including a flange portion having a toothed portion for interlocking with said toothed portion of said end portion of said cylindrical body portion for preventing rotation of said sleeve in relation to said cylindrical body portion, and said sleeve having an interiorly threaded bore for engaging a threaded member inserted in said tubular rivet structure from said flanged end, said threaded bore terminating in an enlarged bore of substantially uniform diameter at the end opposite said flanged portion thereby providing for flaring the wall of said enlarged bore into contact with the wall of said outwardly flared bore at said flanged end of said cylindrical body portion for additionally securing said cylindrical body portion and said sleeve against axial separation.

9. A tubular rivet structure adapted to be seated and upset in an aperture in a wall from one side only of said wall, said rivet structure comprising a body member insertable in said aperture from said side with an end portion projecting beyond the other side of said wall, said body member comprising a seating portion at the end opposite said end portion and an intermediate portion adjacent said seating portion, and said body member having a bore extending from said end portion and terminating in a counterbore in said intermediate and said seating portions, the wall of said intermediate portion being of lesser thickness than the wall of said end portion, a second body member disposed within the first said member at said end portion thereof in telescopic and snugly fitting relation therewith, said second body member having a threaded bore therein for removably engaging a threaded member inserted in the rivet structure from said seating portion to draw said end portion and said seating portion toward one another and expand said intermediate portion outwardly, and means for securing the second member against relative movement with respect to said end portion in the direction of said seating portion of the first said member and for applying axial force to the first said member at said end portion thereof for expanding said intermediate portion while said second body member remains secured with respect to said end portion.

10. A tubular rivet structure adapted to be seated and upset in an aperture in a wall from one side only of said wall, said rivet structure comprising a body member insertable in said aperture from said side with an end portion projecting beyond the other side of said wall, said body member comprising a seating portion at the end opposite said end portion and an intermediate portion adjacent said seating portion, and said body having a bore extending therethrough from said seating portion, the wall of said intermediate portion being of lesser thickness than the wall of said end portion, a second body member disposed within the first said member at said end portion thereof in telescopic and snugly fitting relation therewith, said second body member comprising a flange portion at one end thereof in abutting contact with said end portion of the first said body member for applying axial force thereto to expand said intermediate portion, and said second body member having a threaded bore therein for removably engaging a threaded member inserted in the rivet structure from said seating portion to draw said end portion and said seating portion toward one another and expand said intermediate portion outwardly, and means for securing the second said member against relative rotative movement with respect to said end portion of the first said member.

RAY H. GILL.